Patented June 3, 1952

2,599,400

UNITED STATES PATENT OFFICE 2,599,400

METHOD OF MAKING STABLE PLASTIC MOLDING COMPOSITION OF LOW SHRINKAGE AND PRODUCT OBTAINED THEREBY

Allan B. Leerburger, New York, N. Y.

No Drawing. Application March 23, 1950,
Serial No. 151,518

8 Claims. (Cl. 260—89.5)

This invention relates to polymerizable compositions and methods of preparing same and more particularly relates to polymerizable molding and welding compositions and methods of preparing such compositions.

There exists a long felt need for a polymerizable molding composition which can be readily molded at low temperatures and pressures with a negligible amount of contraction or shrinkage. A need also exists for such a composition which if it is not molded at once may be stored at room temperatures for lengths of time without becoming useless.

The thermoplastic industry and more particularly those manufacturing and fabricating plastic sheets and products have long been searching for a composition which will readily cause sheets of plastic, with or without nonresinous materials between them, to be firmly welded together so that they form an integral solid body. Processes and substances now in use for laminating sheets of thermoplastics merely cause them to adhere together as glued objects stick to one another. Such sheets cannot be easily fabricated as they tend to separate when worked on.

It is well known that homogeneous plastic masses can be prepared by mixing a monomer and polymer, the mixture being thoroughly masticated, for example, in a "Banbury" mixer, or allowed to stand for a sufficient time until a gum or rubbery mass is formed. While in a rubber state these doughs or masses can be molded at comparatively low pressures and temperatures, but these mold doughs of the prior art have had such high shrinkage and lack of uniformity that they have not been practical commercial products. Because of this lack of uniformity, the products molded develop heat spots which give a rough surface to the molded object, and there are sometimes white spots in the products which seem to be regions of excess polymer.

It is an object of this invention to provide an improved polymerizable molding composition which can be conveniently molded at low temperatures and pressure with inexpensive molding equipment, and which has uniformity in the distribution of the monomer and the polymer, and which also has extremely low shrinkage.

Another object of the invention is to provide a method of making the improved polymerizable molding composition of this invention in an efficient and economical way.

With this invention, the proportions of monomer and the polymer that are mixed together depends upon the use for which the product is intended. For a molding composition, that is to be used for compression, a stiffer product is desirable than in the case of a composition that is to be used for dental work where small quantities are squeezed from a tube for making dental plates.

The polymer used for this invention is in the form of a finely ground powder, and in describing mixtures and examples all proportions given are by weight. The invention will be described as applied to mixtures of monomer and polymer of the same material, but as explained later, some combinations of different materials can be used.

When the monomer and polymer are first mixed and the stirrer is stopped, the separation of the monomer and polymer is very rapid because of their difference in density. As the polymer dissolves in the monomer, viscosity of the monomer increases. A 50—50 mixture becomes very viscous after one half hour, and if stirring is stopped, the time of separation of the remaining undissolved polymer and the thickened monomer takes a great deal longer. After a period of stirring for about one hour and a half the monomer-polymer mixture becomes so viscous that a spoonful of the mixture, when dropped on top of the surface leaves droplets that take two or three minutes to disappear into the mass. The mixture is then in the form of a thick paste and is ready to be poured into closed containers in which the paste is allowed to jell.

After standing overnight in the closed container at room temperature, the paste jells into a gum-like substance having a consistency similar to that of a candy gum drop. A longer period is required to jell at low temperature and a shorter period at higher temperature; but the temperature should be kept below about 120° F. because at higher temperatures there is danger of auto-polymerization which once started cannot be stopped and the material will become useless.

Aluminum seems to be the best material for the container in which the monomer-polymer paste is allowed to jell because the jelled material or gum does not stick to the aluminum and is very easily removed from the container in one solid chunk conforming to the configuration of the container. The aluminum used for ice box trays has proved to be suitable in practice.

The monomer-polymer gum is then milled until its consistency becomes that of a soft putty which is formable and can be sheeted in a manner similar to milled rubber. A period of about ten minutes is usually sufficient milling time.

If left standing in the air for several days the sheets gradually harden because of the evaporation of the monomer, and if the amount of monomer which evaporates is excessive, the material of the sheets will no longer be useful for molding. When the material is to be used for compression molding, the percentage of monomer should not be allowed to drop below about 45%.

The mechanical milling of the monomer-polymer gum produces a denser and more uniform material that is substantially softer than the product was before milling. The physical changes seem to be the result of a reorientation of the molecules as a result of the milling operation. In addition to making the composition soft and pliable, the milling substantially reduces the amount of shrinkage that occurs when the composition is molded.

By employing pressures up to 700 pounds and temperatures up to 320° F. it is possible to effect the polymerization of the composition in a mold in from one to three minutes, depending upon the thickness of the molded object. The higher the temperatures used in molding, the shorter will be the time required for polymerization of the composition.

Unless dyes or pigments have been added to the original mixture or to the composition before molding the finished or molded products produced will be hard, clear substances, the shape of the mold. If dyes or pigments are used, the finished product will not be clear but will otherwise have the same characteristics as the clear plastic. Nonresinous objects may be properly placed in the composition and the molded product will be produced with the object embedded therein. Unlike other compositions which are subject to a large contraction or shrinkage during the molding period, the composition of this invention undergoes a minimum of shrinkage thus making elaborate "follow-through" mechanisms in the mold.

The preferred material used for this invention is a mixture of the monomer and polymer of methyl methacrylate, but other acrylic plastics can be used, such as the ester of acrylic acid; the ester of methyl acrylic acid, cyclohexyl methyl methacrylate; and methyl ethyl methacrylate.

The monomer is inhibited. This may be done by adding 40 parts per million of hydroquinone, or other inhibitor. A catalyst is also added to the mixture in accordance with plastic practice. This catalyst is preferably benzoyl peroxide. Other catalysts can be used, for example, tertiary butyl perbenzoate or acetyl peroxide (100 percent pure peroxide in acetic anhydride).

A plasticizer is used in the mixture. Suitable plasticizers are oleic acid, dioctyl phthalate, dibutyl phthalate, diethyl phthalate, dibutyl sebacate, methoxy ethyl oleate.

Example 1

For making a composition that is thin enough to be supplied to the user in collapsible tubes for dental laboratories, 600 parts of monomer and 400 parts of polymer are mixed with 12 parts of plasticizer, preferably oleic acid, and 6 parts of catalyst, preferably benzoyl peroxide. The monomer is inhibited. This mixture is stirred with a mechanical stirrer until the consistency is such that no separation of the monomer and polymer takes place when the stirring is stopped. This takes approximately an hour of stirring depending upon the temperatures, speed of stirring and the fineness of the polymer powder.

The composition, in the form of a paste, is then poured into containers which are covered and allowed to stand from 12 to 24 hours until the composition acquires a consistency corresponding to that of a gum drop, as previously explained. The material is milled to soften it to the composition of a soft putty. If it is desired to have a pink color to the composition, a pink oxide or red dye is added during the milling process. When this material is put into an airtight collapsible tube, it will remain substantially unchanged for a long period of time.

Example 2

Fifty-five parts of a mixture of equal quantities of ethyl methacrylate monomer and methyl methacrylate monomer are mixed with 45 parts of a polymer mixture comprising equal quantities of ethyl methacrylate polymer and methyl methacrylate polymer. The inhibitor, catalyst and plasticizer are also included in the mixture as in the previous example, and the treatment of the materials is substantially the same as in Example 1. After milling, the final product obtained has the consistency of a slightly stiffer putty than in the case of Example 1.

Example 3

For a clear compression molding composition, particularly good results are obtained with a mixture of 500 parts of inhibited methyl methacrylate monomer, 500 parts of methyl methacrylate polymer, 10 parts of oleic acid, 5 parts of benzoyl peroxide. This mixture is stirred, as previously explained, and then allowed to stand in a covered container until it attains the consistency of a gum drop. The material is then milled to a pliable product having the consistency of a medium stiff putty. The composition is stored in covered containers.

Where colors are added to methyl methacrylate materials the color can be added either to the monomer before the jelly or gum is obtained, or the color can be added as pigment to the monomer-polymer mixture during the milling operation.

The useful range of variation of the monomer and polymer ratio appears to be from about 35 parts of polymer and 65 parts of monomer, for very soft molding material, to about 65 parts of polymer to 35 parts of monomer for stiff compression molding material.

Experience indicates that results similar to those already described are obtained with styrene monomer and styrene polymer; and vinyl monomer and vinyl polymer; and mixtures of vinyl monomer and methyl methacrylate polymer, or methyl methacrylate monomer and vinyl polymer, and various other mixtures of the acrylic plastics described.

The preferred embodiments of this invention have been described, but changes and modifications can be made without departing from the invention as defined in the claims.

What is claimed is:

1. The method of producing a polymerizable molding composition, which method comprises mixing together an inhibited monomer and a polymer of styrene in proportions between 35% monomer to 65% polymer, and 65% monomer to 35% polymer, stirring the mixture until the polymer dissolves in the monomer and forms a thick paste which does not separate when the stirring is stopped, mixing a polymerization catalyst with the monomer and polymer while the mixture is still liquid, leaving the composition until it jells into a gum, and milling the gum to make it a soft and pliable sheet and to reorient the molecules to produce a molding composition of low shrinkage.

2. The polymerizable composition obtained by milling to substantially the consistency of a soft putty a jelled gum consisting essentially of polymerization catalyst and a mixture of the inhibited monomer and the polymer of an acrylic plastic, which monomer and polymer were originally mixed until they did not separate from one another and then allowed to stand until they formed the jelled gum.

3. The molding composition obtained by milling, for a period of the order of ten minutes, a jelled composition containing substantially equal parts of an inhibited monomer and a polymer of acrylic plastic mixed with a plasticizer and a catalyst, which monomer and polymer were originally mixed until they did not separate from one another and then allowed to stand until they formed the jelled gum.

4. The method of making an improved molding composition that has low shrinkage characteristics during molding, which method comprises mixing a inhibited monomer and a polymer in proportions between 35 parts of monomer to 65 parts of polymer, and 65 parts of monomer to 35 parts of polymer, together with a polymerization catalyst, both the monomer and polymer being from the group consisting of methyl methacrylate, the ester of acrylic acid; the ester of methyl acrylic acid; cyclohexyl methyl methacrylate; methyl ethyl methacrylate; and styrene, stirring the mixture until it becomes thick and the monomer and polymer no longer separate when the stirring is stopped, keeping the mixture in a container until the mixture jells into a gum, and thereafter softening the composition by milling the gum until it acquires substantially the soft and pliable characteristics of soft putty.

5. The process of preparing an improved molding composition that has low shrinkage characteristics during molding, which process comprises mixing an inhibitited monomer and a polymer of the same material together with a polymerization catalyst, both the monomer and polymer being from the group consisting of methyl methacrylate, the ester of acrylic acid; the ester of methyl acrylic acid; cyclohexyl methyl methacrylate; methyl ethyl methacrylate; and styrene, stirring the material until the monomer becomes dissolved in the polymer and the mixture attains the consistency of a paste, leaving the paste for a period of from 12 to 24 hours until the paste jells into a thick gum, and thereafter milling the gum until it softens and the molecules are reoriented to produce the molding composition of low shrinkage characteristics.

6. The method of making an improved molding composition which method comprises mixing inhibited methyl methacrylate monomer with methyl methacrylate polymer in proportions between 35% monomer to 65% polymer, and 35% polymer to 65% monomer, together with a polymerization catalyst, stirring the mixture until the polymer is dissolved in the monomer and the mixture has the consistency of a thick paste, leaving the paste from 12 to 24 hours until it jells into a gum, and thereafter milling the gum for a period of the order of ten minutes to soften it, increase its density, and reorient the molecules to obtain a molding composition that has substantially no shrinkage when molded.

7. The method of making an improved molding composition which method comprises mixing inhibited methyl methacrylate monomer with methyl methacrylate polymer in substantially equal parts, stirring the mixture until the polymer is dissolved in the monomer and the mixture has the consistency of a thick paste, mixing a polymerization catalyst with the monomer and polymer while the mixture is still liquid, leaving the paste from 12 to 24 hours until it jells into a gum, and thereafter milling the gum for a period of the order to ten minutes to soften it, increases its density, and reorient the molecules to obtain a molding composition that has substantially no shrinkage.

8. The method of making an improved molding composition which method comprises mixing inhibited methyl methacrylate monomer with methyl methacrylate polymer in substantially equal parts, and including in said mixture substantially 2% of plasticizer and 0.75% of catalyst, stirring the mixture until the polymer is dissolved in the monomer and the mixture has the consistency of a thick paste, leaving the paste from 12 to 24 hours until it jells into a gum, and thereafter milling the gum for a period of the order of at least ten minutes to soften it, increase its density, and reorient the molecules to obtain a molding composition that has substantially no shrinkage.

ALLAN B. LEERBURGER.

REFERENCES CITED

The following references are of record in the file of this patent:

UNITED STATES PATENTS

| Number | Name | Date |
| --- | --- | --- |
| 2,120,006 | Strain | June 7, 1938 |
| 2,234,993 | Vernon et al. | Mar. 18, 1941 |